United States Patent [19]

Cuscurida et al.

[11] Patent Number: 4,521,572
[45] Date of Patent: Jun. 4, 1985

[54] EPOXY RESIN MODIFIED POLYETHER POLYOLS FROM MIXED INITIATORS

[75] Inventors: Michael Cuscurida; Bruce W. Peterson, both of Austin, Tex.

[73] Assignee: Texaco Inc., White Plains, N.Y.

[21] Appl. No.: 582,241

[22] Filed: Feb. 22, 1984

[51] Int. Cl.$^3$ ....................... C08L 61/14; C08G 65/08
[52] U.S. Cl. .................................... 525/507; 521/167; 521/174; 521/175; 525/523; 528/103; 528/418; 568/609; 568/620; 568/623; 568/624; 568/625
[58] Field of Search ....................... 525/523, 480, 507; 521/175, 177, 914; 528/103, 418; 568/609, 620, 623, 624, 625

[56] References Cited

U.S. PATENT DOCUMENTS

| | | | |
|---|---|---|---|
| 4,309,532 | 1/1982 | Cuscurida et al. | 525/507 |
| 4,316,991 | 2/1982 | Speranza et al. | 521/174 |
| 4,323,658 | 4/1982 | Speranza et al. | 521/914 |
| 4,451,588 | 5/1984 | Speranza et al. | 521/175 |

*Primary Examiner*—Theodore E. Pertilla
*Attorney, Agent, or Firm*—Jack H. Park; Kenneth R. Priem; David L. Mossman

[57] ABSTRACT

Novel modified polyether polyols made by first optionally alkoxylating, subsequent reaction with epoxy resins and final alkoxylation of mixtures of initiators is described. The initiator mixture is made up of about 60 to 90 wt. % of a partially alkoxylated trifunctional initiator and 10 to 40 wt. % of a secondary partially alkoxylated initiator having an active hydrogen functionality of from 4 to 8. Preferably, the alkylene oxide component is a blend of ethylene oxide and propylene oxide, and the resulting modified polyol molecules have 0.25 to 2.5 wt. % internally located epoxy resin. Flexible polyurethane foams made from these polyether polyols have improved load bearing properties as compared with those made from prior art polyols.

20 Claims, No Drawings

EPOXY RESIN MODIFIED POLYETHER POLYOLS FROM MIXED INITIATORS

CROSS-REFERENCE TO RELATED APPLICATION

This application is related to U.S. patent application Ser. No. 517,197 filed on July 26, 1983 which concerns polyether polyols made from mixed initiators in the absence of any modification with epoxy resins.

BACKGROUND OF THE INVENTION

1. Field of the Invention

The invention relates to polyether polyols made by alkoxylating polyfunctional initiators and more particularly relates to polyether polyols made from alkoxylating a mixture of partially alkoxylated initiators having different numbers of active hydrogens which was modified with epoxy resins.

2. Other Polyols in the Field

Presently, polyether polyols suitable for use in flexible foams are made by the reaction of trifunctional initiators such as glycerine with mixtures of alkylene oxides. Persons skilled in the art of making polyols can add alkylene oxides to polyhydric initiators such as glycerine or to an intermediate molecular weight alkylene oxide adduct of the initiator to prepare products in the 40–60 hydroxyl number range. For examples of polyols made by this technique, see U.S. Pat. Nos. 3,393,243; 3,535,307; 3,706,714; 3,847,992; 4,166,172 and 4,316,991.

While generally satisfactory, foam prepared from the prior art polyols are not firm enough for many cushioning applications, particularly at lower foam densities. Conventional means of producing firmer (higher ILD) foams such as higher functionality initiators, short chain crosslinkers or fillers lead to other deficiencies in foam properties such as closed cells, poor tear and elongation properties and increased foam density. It is, therefore, an object of this invention to increase the functionality of triols and the like by mixing in a minor portion of a higher functionality polyol initiator and modifying the mixture with epoxy resins. Several patents describe mixtures of initiators used to prepare polyols for polyurethane foams. Almost all are concerned with the preparation of polyols for rigid urethane foams. Usually, these processes involve sucrose with water, glycols, glycerine, etc. The use of lower functional polyols permit one to make polyols for rigid urethane foams that are easier to handle and the resulting rigid foams have much finer cells.

A recent example is U.S. Pat. No. 4,380,502 which employs 80 to 20 wt.% of formitol (a mixture of polyhydric alcohols having an average hydroxyl functionality of at least 3) and 20 to 80 wt.% of sucrose. The introductory section of this patent is a good summary of the art of mixed initiators and is incorporated by reference herein.

Also of interest is Japanese Kokai Tokkyo Koho JP 57,174,313 (82,174,313), see Chemical Abstracts 98: 144401c (1983). This disclosure describes urethane foams having good post formability by hot pressing which are prepared from reacting polyisocyanates and polyol mixtures. The polyol mixtures are 30 to 90 parts of polyether polyols derived from a 10 to 40:60 to 90 molar mixture of sucrose and glycerol, respectively, and alkylene oxides having a molecular weight between 4000 and 10,000, and 10 to 70 parts of polyether diols and/or triols having an average hydroxyl number between 50 and 300. Apparently, sucrose and glycerol are first mixed and then the alkylene oxides are reacted therewith (for example, a 90:10 propylene oxide/ethylene oxide mixture) before a polyether diol is added thereto to give the polyol component for the foams described therein. This method is quite different from the invention herein, particularly with regard to when the various alkoxylations take place.

Other patents disclose reactions involving polyols and epoxy resins. Japanese Pat. No. 71-24,255 concerns the reaction of a glycerine-based 3,000 molecular weight triol with 2% bisphenol A epoxy resin to produce foams with increased hardness. A close examination of this patent will show that the epoxy resin is added at only the end of the triol chain. Where the epoxy resin is added in the polyol chain will make a substantial difference in how the modified polyol performs in producing open-celled flexible foams with improved load bearing properties.

U.S. Pat. No. 3,012,984 describes how hydroxyl terminated polyesters, epoxy resins and isocyanate terminated prepolymers may be reacted in an inert organic solvent to produce metal primers and coatings. U.S. Pat. No. 3,010,940 discloses how phenol, epoxy resins, polyisocyanates and alphamethylbenzyldimethylamine react to produce various polyurethane coatings.

U.S. Pat. No. 3,448,046 describes how polyols containing chlorine are mixed with epoxy resins before reaction with an isocyanate. The free epoxides scavenge the HCl in the polyol and do not contribute to the functionality of the polyol. The reaction of an epoxide with an alcoholic hydroxyl group is set out in U.S. Pat. No. 3,317,609. Further, British Pat. No. 968,102 describes how polyols suitable for polyurethane foams may be prepared from the reaction of a polyol and an epoxy resin in the presence of an acidic catalyst.

Further prior art polyols include those described in German Offenlegungschrifft No. 2,056,080. This patent describes how epoxy adhesives may be made by the reaction of epoxy resins with 4-mercaptobutanol-blocked urethane prepolymers which are made from toluene diisocyanate and various polyols. German Offenlegungschrifft No. 1,905,696 discloses how polyurethane latices may be produced by chain extending a urethane prepolymer by using the reaction product of polyethylene glycols of a molecular weight of about 5,000 to 10,000 and an aromatic diglycidyl ether. The modification of epoxy resins by heating them with added polyalkoxylated disaccharides is described in Belgium Pat. No. 785,020.

Also of particular interest is U.S. Pat. No. 4,316,991 to Speranza, et al. which describes the modification of polyether polyols by their reaction with epoxy resins and alkylene oxides such that the epoxy resin is positioned internally in the resulting modified polyol, as well as the reference cited in the prosecution therein. U.S. Pat. No. 4,309,532 concerns the modification of rigid amino polyols by their reaction with epoxy resins and alkylene oxides, while U.S. Pat. No. 4,323,658 details a method of preparing polyether polyols in the 200 to 1,000 molecular weight range by modifying a polyol initiator with an epoxy resin and one or more alkylene oxides.

SUMMARY OF THE INVENTION

The invention concerns a modified mixed initiator polyol made by reacting a mixture of initiators with an epoxy resin and one or more alkylene oxides in such a manner that the epoxy resin is added internally along the length of the polyol chain. The mixture of initiators comprises 60 to 90 wt.% of a trifunctional partially alkoxylated initiator and 10 to 40 wt.% of a secondary partially alkoxylated initiator having an active hydrogen functionality of from 4 to 8.

DETAILED DESCRIPTION OF THE PREFERRED EMBODIMENTS

As noted above, a mixture or blend of initiators is required. The majority of the mixture should comprise a trifunctional initiator; that is, a compound having three and only three active hydrogens. This initiator must be partially alkoxylated. Examples of suitable trifunctional initiators are alkylene oxide adducts of glycerine, trimethylolpropane, triethanolamine, 1,2,6-hexanetriol, monoethanolamine, diethanolamine, aminoethylpiperazine, among others. Especially preferred triols are glycerine (also called glycerol), trimethylolpropane and triethanolamine. It is also preferred that the trifunctional initiator make up from about 60 to 90 wt.% of the initiator mixture, based on the total mixture weight.

An unusual feature of the invention is the incorporation of a minor portion of one other polyhydric initiator, termed a secondary initiator. The word "secondary" does not refer to the functionality of the initiator but is used to distinguish the initiator present in minor proportions as opposed to the major initiator discussed above. Preferably, the initiator is selected from a group of suitable initiators having 4 to 8 active hydrogens. This initiator is also partially alkoxylated.

Suitable secondary initiators include alkylene oxide adducts of methyl glucoside, ethylenediamine, sorbitol, sucrose, hydroxypropyl glucoside, pentaerythritol, erythritol, among others. Styrene-allyl alcohol copolymers may also be used. Particularly preferred are methyl glucoside, ethylenediamine, sorbitol and sucrose. The secondary initiator should comprise from about 10 to 40 wt.% of the total initiator mixture.

Both of the initiator types described above are preferably partially alkoxylated before mixing, although conceivably they could be mixed before any alkoxylation. The alkylene oxides to be used in these partial alkoxylations are preferably ethylene oxide, propylene oxide, 1,2-butylene oxide and mixtures thereof. The oxides may be added by reacting the initiators with the oxides in the presence of a catalyst at an elevated temperature in the range of about 75° to 150° C. Typically this alkoxylation reaction is conducted in the presence of an alkaline catalyst such as sodium hydroxide or potassium hydroxide. Other catalysts are also known such as cesium hydroxide, calcium hydroxide, trialkylamines and aqueous ammonia.

The term "partial alkoxylation" does not refer to a specific amount or even a range of proportions. Rather, since some of the alkoxy moieties are to be placed preferably before and after the internal epoxy resin section of the ultimate molecule, the addition of alkylene oxide before reaction with epoxy resin is referred to as a partial alkoxylation. How much alkylene oxide is added before the epoxy resin relative to after is left up to the practitioner. In this way, the epoxy resin is added at selected points. Preferably, the mixed initiators are partially alkoxylated again as a mixture before the epoxy resin reaction step. Next, the epoxy resin is added at selected points internally along the length of the polyol chain. This tends to increase the overall functionality of the polyol chain. Prior art techniques discussed above tend to add epoxy at the end only. It is recommended that at least two equivalents of hydroxyl functionality be present per equivalent of epoxy resin added to the reaction mixture to avoid gelling of the epoxy by cross linking with itself. The epoxy resin may be added before, during and/or after the addition of alkylene oxide to the polyol initiator. The best results are obtained if the resin is not added only as a "cap", that is, after all of the oxide has been added which results in the resin being attached to the end of the resulting polyol chain only. One skilled in the art who is practicing this invention may determine the best procedure with respect to when additions should be made and at what temperature and during which times the reaction mixture is to be heated within the scope of this invention.

It is anticipated that a wide variety of epoxy resins would be useful in practicing this invention. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred. The diglycidyl ether of bisphenol A (DGEBPA) is used in the examples herein. Some of these epoxy resins are known in the trade as EPON® resins and may be obtained from Shell Chemical Co.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for a particular use. The examples herein use a pressure of about atmospheric to 250 psig and a temperature of about 100° to 150° C. as representative conditions for the making of modified polyols that would be useful in flexible foams. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by cross-linking with itself. As a result a large excess of hydroxyl equivalents may be used in the reaction mixture and still be within the spirit and scope of this invention.

The alkylene oxide to be added into the epoxy modified mixed alkoxylated polyhydric initiator product may be ethylene oxide, propylene oxide, 1,2-butylene oxide and mixtures thereof. It is especially preferred that the alkylene oxide component to be used is a mixture of ethylene oxide and propylene oxide. These same alkylene oxides are the ones suitable for addition to the initiators before mixing.

The amount of alkylene oxide component to be employed in each initiator will vary. Therefore, the average functionality of the initiator mixture will vary and the amount of alkylene oxide component required to totally alkoxylate the mixture of alkoxylated initiators will also vary according to the desires of the experimenter. It is preferred that first a mixture of ethylene oxide and propylene oxide be used and then the polyol finally capped with propylene oxide. The molecular weight and hydroxyl number of the polyol may be built up by using an excess of alkylene oxide component beyond what is necessary to totally alkoxylate the initiators.

Again, the alkoxylation reaction should be conducted with a catalyst at an elevated temperature in the range of about 75° to 150° C. The well known way of conducting this alkoxylation reaction is again to use a catalyst, frequently an alkaline catalyst such as sodium hydroxide or potassium hydroxide.

The resulting polyols may have a molecular weight in the range of between 1000 and 20,000. It is preferred that the polyols have a molecular weight between 3000 and 10,000 and especially preferred that the molecular weight be between 3000 and 6500. Further, it is preferred that the resulting polyols have a hydroxyl number of from about 20 to 60 and that the polyol contain about 0.25 to 2.5 wt.% of combined epoxy resin. These polyether polyols are particularly suited for the preparation of flexible polyurethane foam. Foams made from these polyols have improved load bearing properties as compared to those made from prior art polyols. Surprisingly, the improved load bearing characteristics of these foams were not made at the expense of other important properties.

Examples of foam preparation are presented to demonstrate the utility of the polyether polyols. It is well known that flexible and other types of foams may be made generally by reacting the polyols with polyisocyanates in the presence of a polyurethane formation catalyst, such as a tertiary amine or tin catalyst, optionally in the presence of a blowing agent and other additives. For more details on polyurethane foam preparation see U.S. Pat. No. 3,535,307, among others.

The polyether polyol invention is further illustrated by the following examples.

EXAMPLE 1

This example will illustrate the preparation of the diglycidyl ether of Bisphenol A (DGEBPA) modified mixed initiator polyols of this invention. Propylene oxide and ethylene oxide are abbreviated PO and EO, respectively.

Into a 10 gallon kettle were charged 8 pounds of a 600 molecular weight PO/EO adduct of glycerine (GE-620 made by reaction of one mole of glycerine with 3 moles of EO and 6.5 moles of PO in the presence of potassium hydroxide catalyst by Texaco Chemical Co.). The GE-620 initiator had a final alkalinity of 25.88 mg KOH/g. Two pounds of a 700 molecular weight PO adduct of sorbitol (ATPOL ® 2410 made by ICI America) were also added. The reactor was then evacuated and purged with prepurified nitrogen. Maintaining a nitrogen purge, the reaction mixture was heated to 100° C. At this point the reaction mixture had a water content of 0.05 wt.%. A mixture of 28.9 pounds of PO and 4.7 pounds of EO was then reacted at 105°-110° C. at 50 psig. Approximately 3.25 hours were required for addition of the mixed PO/EO. The reaction mixture was then digested 1.7 hours to an equilibrium pressure. DGEBPA* (0.6 lb) was then charged to the kettle and reacted for 15 minutes. A mixture of 28.9 pounds of PO and 4.7 pounds of EO was then added at 105°-110° C. at 50 psig over a 2.5 hour period. The reaction was terminated by reaction with 2.4 pounds of PO. After digestion to an equilibrium pressure, the alkaline product was neutralized by stirring two hours with an aqueous slurry of 560 g magnesium silicate. Octylated diphenylamine (32.7 g) and 2,6-di-t-butyl phenol-4-secbutyl phenol (109 g) were then added to stabilize the product. After neutralization, the product was vacuum stripped to a minimum pressure, nitrogen stripped one-half hour and filtered. The finished product had the following properties:

| Properties | |
|---|---|
| Acid number, mg KOH/g | 0.004 |
| Hydroxyl number, mg KOH/g | 41.4 |
| Water, wt. % | 0.01 |
| Unsaturation, meq/g | 0.032 |
| pH in 10:6 isopropanol/water | 7.4 |
| Color, Pt—Co | 40–50 |
| Sodium, ppm | 0.2 |
| Potassium, ppm | 0.2 |
| Peroxide, ppm | 2.2 |
| Viscosity, °F., cs | |
| 77 | 944 |
| 100 | 481 |

PO/EO (by nuclear magnetic resonance) 84.4/15.6
*EPON ® 828 made by Shell Chemical Co.

EXAMPLES 2–7

This example will further illustrate the preparation of the mixed initiator, DGEBPA-modified polyols of this invention. These polyols were prepared to contain 0.5–1.75 wt.% combined DGEBPA and had hydroxyl numbers ranging from 37.7–50.9 mg KOH/g. The procedure described in Example 1 was used for preparation of these products.

Reaction charges, details of preparation, and properties of these polyols are shown in the Table I.

EXAMPLE 3

This example will illustrate the use of a mixed initiator polyol (40.6 hydroxyl) prepared as described in Example 1 in the preparation of flexible foams. This polyol was prepared to contain 0.8 wt.% combined DGEBPA and was made using a 4:1 mixture of GE-620 and a 700 molecular weight PO adduct of sorbitol as the initiator. The data will show that foams made from this polyol were 20% firmer than those made from a 3000 molecular weight prior art polyol (hydroxyl no.; mg KOH/g 56). The prior art polyol was a 3000 molecular weight PO/EO adduct of glycerine (THANOL ® F-3016 made by Texaco Chemical Co.). The data will further show that foams prepared from this polyol had properties similar to those of a prior art DGEBPA-modified polyol (THANOL F-3050 made by Texaco Chemical Co. according to the procedures of U.S. Pat. No. 4,316,991, incorporated by reference herein). The higher loads were obtained without loss in tensile, tear elongation and compression set and the foams had good ball rebound properties. The lower isocyanate requirement for polyols of this invention (lower hydroxyl number, for equally firm foams) demonstrates the improved economics of foam manufacture using these polyols.

Formulations, details of preparation and foam properties are shown in Table II. All foams were processed on a Martin Sweets foam machine.

TABLE I

| | Preparation of Mixed Initiator DGEBPA-Modified Polyols | | | | | |
|---|---|---|---|---|---|---|
| Examples | 2 | 3 | 4 | 5 | 6 | 7 |
| Charge | | | | | | |
| GE-620, lb[a] | 7 | 8 | 10 | 8 | 8 | 8 |
| ATPOL 2410, lb[b] | 3 | 2 | 2.5 | 2 | 2 | 2 |
| Propylene oxide, lb (step 1 mixed) | 26.5 | 22.7 | 27.2 | 29.0 | 29.0 | 29.0 |
| Ethylene oxide, lb | 4.5 | 3.6 | 4.5 | 4.8 | 4.8 | 4.8 |
| DGEBPA, lb | 0.55 | 0.5 | 1.45 | 0.65 | 0.65 | 0.6 |
| Propylene oxide, lb (step 2 mixed final) | 26.5 | 22.7 | 27.2 | 29.0 | 29.0 | 29.0 |
| Ethylene oxide, lb | 4.5 | 3.6 | 4.5 | 4.8 | 4.8 | 4.8 |
| Propylene oxide, lb | 2.2 | 1.95 | 2.4 | 2.4 | 2.2 | 2.4 |
| Magnesium silicate, g[c] | 500 | 560 | 690 | 560 | 560 | 560 |
| Di-t-butyl p-cresol, g | 101.7 | 88.6 | 144.7 | 156 | 131.4 | 156 |
| Octylated diphenylamine, g | 40.7 | 35.4 | 21.7 | 23.4 | 19.7 | 23.4 |
| Reaction Details | | | | | | |
| Oxide addition time, hr | 8.9 | 6.1 | 6.5 | 8.3 | 9.5 | 4.9 |
| Temperature, °C. | 105–110 | 105–110 | 105–110 | 110–115 | 110–115 | 110–115 |
| Pressure, psig | 50 | 50 | 50 | 50 | 50 | 50 |
| DGEBPA content, wt. % | 0.75 | 0.5 | 1.75 | 0.8 | 0.8 | 0.8 |
| Properties | | | | | | |
| Acid no., mg KOH/g | 0.005 | 0.005 | 0.012 | 0.006 | 0.004 | 0.006 |
| Hydroxyl no., mg KOH/g | 45.4 | 43.8 | 50.5 | 37.7 | 44.0 | 40.3 |
| Water, wt. % | 0.01 | 0.02 | 0.01 | 0.02 | 0.02 | 0.01 |
| Unsaturation, meq/g | 0.029 | 0.028 | 0.026 | 0.039 | 0.039 | 0.034 |
| pH in 10:6 isopropanol/water | 7.3 | 7.2 | 7.4 | 7.5 | 7.4 | 7.5 |
| Color, Pt—Co | 50–75 | 50–75 | 40–50 | 30–40 | 30–40 | 30–40 |
| Sodium, ppm | 0.2 | 0.2 | 0.2 | 0.2 | 0.2 | 0.2 |
| Potassium, ppm | 0.2 | 0.2 | 0.2 | 0.2 | 0.2 | 0.2 |
| PO/EO (by NMR) | 84/16 | 83.6/16.4 | — | 83.7/16.3 | 85.6/14.4 | — |
| Viscosity, °F., cs | | | | | | |
| 77 | 859 | 738 | 976 | 978 | 870 | 932 |
| 100 | 435 | 374 | 479 | 491 | 384 | 473 |

[a]600 molecular weight PO/EO adduct of glycerine; precatalyzed to contain 2.5 wt. % potassium hydroxide made by reaction of one mole of glycerine with 3 moles of EO and 6.5 moles of PO.
[b]700 molecular weight PO adduct of sorbitol made by ICI Chemical.
[c]MAGNESOL ® 30/40 made by Pilot Engineering Co.

TABLE 2

| | Flexible Foams From Mixed Initiator DGEBPA-Modified Polyols | | | | | | | | |
|---|---|---|---|---|---|---|---|---|---|
| Example | A | B | C | D | E | F | G | H | I |
| Mixed initiator polyol[a] | 100 | 100 | 100 | — | — | — | — | — | — |

TABLE 2-continued

| Flexible Foams From Mixed Initiator DGEBPA-Modified Polyols | | | | | | | | | |
|---|---|---|---|---|---|---|---|---|---|
| Example | A | B | C | D | E | F | G | H | I |
| THANOL F-3016[b] | — | — | — | 100 | 100 | 100 | — | — | — |
| THANOL F-3050[c] | — | — | — | — | — | — | 100 | 100 | 100 |
| Water | 4.0 | 4.0 | 4.0 | 4.0 | 4.0 | 4.0 | 4.0 | 4.0 | 4.0 |
| L-6202 silicone[d] | — | — | — | — | — | — | 1.0 | 1.0 | 1.0 |
| L-711 silicone[d] | 0.9 | 0.9 | 0.9 | 0.9 | 0.9 | 0.9 | — | — | — |
| THANCAT ® TD-33[e] | 0.3 | 0.3 | 0.3 | 0.3 | 0.3 | 0.3 | 0.2 | 0.2 | 0.2 |
| 50% stannous octoate | 0.27 | 0.32 | 0.37 | 0.32 | 0.37 | 0.42 | 0.3 | 0.4 | 0.5 |
| Toluene diisocyanate (110 index) | 49.47 | 49.47 | 49.47 | 52.1 | 52.1 | 52.1 | 52.1 | 52.1 | 52.1 |
| Foam Processing Conditions | | | | | | | | | |
| Room temperature, °F. | 80 | 80 | 80 | 80 | 80 | 80 | 74 | 74 | 74 |
| Relative humidity, % | 81 | 81 | 81 | 81 | 81 | 81 | 62 | 62 | 62 |
| Polyol temperature, °F. | 77 | 77 | 77 | 77 | 77 | 77 | 76 | 76 | 76 |
| TDI temperature, °F. | 74 | 74 | 74 | 74 | 74 | 74 | 74 | 74 | 74 |
| Foam Properties | | | | | | | | | |
| Density, pcf | 1.56 | 1.38 | 1.38 | 1.53 | 1.51 | 1.51 | 1.5 | 1.52 | 1.48 |
| IFD, lb/50 in$^2$ | | | | | | | | | |
| 25% | 45.5 | 49.5 | 48.5 | 37.9 | 37.5 | 37.5 | 42 | 47 | 48 |
| 65% | 86.5 | 91.5 | 88.8 | 71.0 | 70.0 | 71.0 | 79 | 85 | 89 |
| 25% R | 29.0 | 29.0 | 29.0 | 24.0 | 23.5 | 24.0 | 28.0 | 32.0 | 32.0 |
| Compression set, 50% | 5.7 | 6.3 | 7.5 | 4.1 | 4.3 | 3.7 | 6.1 | 7.5 | 8.0 |
| 90% | 5.9 | 6.0 | 7.9 | 4.1 | 3.8 | 4.3 | 5.6 | 6.1 | 9.6 |
| Tensile, psi | 15.3 | 16.7 | 15.6 | 18.4 | 19.7 | 19.7 | 14.3 | 15.6 | 17.8 |
| Tear, pli | 1.6 | 1.4 | 1.7 | 2.7 | 2.8 | 2.9 | 1.6 | 1.8 | 1.8 |
| Elongation, % | 143 | 130 | 130 | 190 | 197 | 192 | 128 | 131 | 137 |
| Ball rebound, % | 43 | 38 | 39 | 37 | 37 | 38 | 42 | 42 | 39 |
| Breathability, scfm | 4.4 | 3.0 | 1.0 | 5.6 | 5.4 | 4.8 | 4.8 | 3.8 | 1.9 |

[a]Hydroxyl number, mg KOH/g = 40.6
[b]3,000 molecular weight PO/EO adduct of glycerine made by Texaco Chemical Co.
[c]DGEBPA-modified 3,000 molecular weight PO/EO adduct of glycerine made by Texaco Chemical Co.
[d]Surfactant made by Union Carbide Chemical Corp.
[e]33% triethylenediamine in propylene glycol made by Texaco Chemical Co.

Many modifications and variations of the invention as set forth herein may be made without departing from the spirit and scope thereof and, therefore, only such limitations should be imposed as are indicated in the claims set out below. For example, a particular combination of initiators, alkylene oxide properties, epoxy resins and reaction conditions may prove to be particularly advantageous.

We claim:

1. A modified mixed initiator polyol being produced by the process comprising
   reacting a mixture of initiators comprising 60 to 90 wt.% of a trifunctional partially alkoxylated initiator and 10 to 40 wt.% of a secondary partially alkoxylated initiator having an active hydrogen functionality of from 4 to 8 with an epoxy resin having an average of at least 1.8 reactive 1,2-epoxy groups per molecule and one or more alkylene oxides in such a manner that the epoxy resin is added internally along the length of the polyol chain.

2. The modified polyol of claim 1 in which the trifunctional initiator is an alkylene oxide adduct of a triol selected from the group consisting of glycerine, trimethylolpropane and triethanolamine.

3. The modified polyol of claim 1 in which the secondary initiator is an alkylene oxide adduct of a compound selected from the group consisting of methyl glucoside, ethylenediamine, sorbitol and sucrose.

4. The modified polyol of claim 1 in which the epoxy resin is selected from the group of epoxy resins consisting of the diglycidyl ether of Bisphenol A, epoxy novolak resins and aliphatic epoxy resins.

5. The modified polyol of claim 1 in which the alkylene oxide component is selected from the group consisting of ethylene oxide, propylene oxide, 1,2-butylene oxide and mixtures thereof.

6. The modified polyol of claim 1 in which the alkylene oxide component is a mixture of ethylene oxide and propylene oxide.

7. The modified polyol of claim 1 in which the resulting polyol contains 0.25 to 2.5 wt.% of combined epoxy resin.

8. The modified polyol of claim 1 in which the resulting polyol has a molecular weight in the range from 1,000 to 20,000 and a hydroxyl number in the range from 20 to 60.

9. The modified polyol of claim 1 in which the components are reacted in the range of 100°–150° C. during the preparation of the modified polyol.

10. A modified mixed initiator polyol being produced by the process comprising
    a. reacting a mixture of initiators comprising 60 to 90 wt.% of a trifunctional partially alkoxylated initiator and 10 to 40 wt.% of a secondary partially alkoxylated initiator having an active hydrogen functionality of from 4 to 8 with one or more alkylene oxides,
    b. subsequently reacting the reaction product from step a. with an epoxy resin having an average of at least 1.8 reactive 1,2-epoxy groups per molecule where the ratio of equivalents of hydroxyl functionality to equivalents of epoxy is at least 2 to 1, and
    c. subsequently reacting the reaction product from step b. with one or more alkylene oxides such that the resulting modified mixed initiator polyol has the epoxy resin added internally along the length of the polyol chain.

11. The modified polyol of claim 10 in which the trifunctional initiator is an alkylene oxide adduct of a triol selected from the group consisting of glycerine, trimethylolpropane and triethanolamine.

12. The modified polyol of claim 10 in which the secondary initiator is an alkylene oxide adduct of a compound selected from the group consisting of methyl glucoside, ethylenediamine, sorbitol and sucrose.

13. The modified polyol of claim 10 in which the epoxy resin is selected from the group of epoxy resins consisting of the diglycidyl ether of Bisphenol A, epoxy novolak resins and aliphatic epoxy resins.

14. The modified polyol of claim 10 in which the alkylene oxide component used in steps a. and c. is selected from the group consisting of ethylene oxide, propylene oxide, 1,2-butylene oxide and mixtures thereof.

15. The modified polyol of claim 10 in which the alkylene oxide component used in steps a. and c. is a mixture of ethylene oxide and propylene oxide.

16. The modified polyol of claim 10 in which the resulting polyol contains 0.25 to 2.5 wt.% of combined epoxy resin.

17. The modified polyol of claim 10 in which the resulting polyol has a molecular weight in the range from 1,000 to 20,000 and a hydroxyl number in the range from 20 to 60.

18. The modified polyol of claim 10 in which the components are reacted in the range of 100°–150° C. during the preparation of the modified polyol.

19. A modified mixed initiator polyol being produced by the process comprising
   a. reacting a mixture of partially alkoxylated initiators comprising 60 to 90 wt.% of a trifunctional partially alkoxylated initiator which is an alkylene oxide adduct of a triol selected from the group consisting of glycerine, trimethylolpropane and triethanolamine and 10 to 40 wt.% of a secondary partially alkoxylated initiator having an active hydrogen functionality of from 4 to 8 which is an alkylene oxide adduct of a compound selected from the group consisting of methyl glucoside, ethylenediamine, sorbitol and sucrose, with one or more alkylene oxides selected from the group consisting of ethylene oxide, propylene oxide, 1,2-butylene oxide and mixtures thereof to give a reaction product, and
   b. subsequently reacting the reaction product from step a. with an epoxy resin having at an average of at least 1.8 reactive 1,2-epoxy groups per molecule, selected from the group consisting of the diglycidyl ether of Bisphenol A, epoxy novolak resins and aliphatic epoxy resins, where the ratio of equivalents of hydroxyl functionality on the reaction product to equivalents of epoxy in the epoxy resin is at least 2:1, to give a reaction product, and
   c. subsequently reacting the reaction product from step b. with one or more alkylene oxides selected from the group consisting of ethylene oxide, propylene oxide, 1,2-butylene oxide and mixtures thereof such that the resulting modified mixed initiator polyol has about 0.25 to 2.5 wt.% epoxy resin added internally along the length of the polyol chain.

20. The modified polyol of claim 19 in which the resulting polyol has a molecular weight in the range from 1,000 to 20,000 and a hydroxyl number in the range from 20 to 60.

* * * * *